United States Patent [19]
Kielma

[11] 3,782,670
[45] Jan. 1, 1974

[54] CARRIER LINK MECHANISM FOR FLEXIBLE SUPPLY LINES

[75] Inventor: Ervin J. Kielma, Milwaukee, Wis.

[73] Assignee: A & A Manufacturing Company, Inc., New Berlin, Wis.

[22] Filed: Feb. 10, 1972

[21] Appl. No.: 225,240

[52] U.S. Cl..................... 248/51, 59/78.1, 248/68 R
[51] Int. Cl. ............................................... F16l 3/00
[58] Field of Search.......................... 248/51, 52, 68; 59/78, 78.1; 287/14; 16/128 R, 166; 299/82, 83, 84

[56] References Cited
UNITED STATES PATENTS

| | | | |
|---|---|---|---|
| 2,899,159 | 8/1959 | Leblang | 248/68 R X |
| 553,650 | 1/1896 | Kingsland | 59/78 X |
| 3,448,954 | 6/1968 | Kurlandsky | 248/51 |
| 3,330,105 | 7/1967 | Weber | 59/78.1 |
| 3,448,953 | 6/1969 | Kurlandsky | 248/51 |
| 3,503,578 | 3/1970 | Kurlandsky | 248/51 |
| 3,503,579 | 3/1970 | Kurlandsky | 248/51 |
| 3,504,864 | 4/1970 | Kurlandksy | 248/51 |
| 3,053,358 | 9/1962 | Gross | 248/68 R X |
| 814,354 | 3/1906 | Carter | 16/166 |
| 863,214 | 8/1907 | Phelps | 287/14 X |

FOREIGN PATENTS OR APPLICATIONS

| | | | |
|---|---|---|---|
| 1,075,974 | 7/1967 | Great Britain | 59/78.1 |
| 177,348 | 1/1954 | Germany | 16/128.1 |
| 248,002 | 5/1963 | Australia | 299/82 |

Primary Examiner—Frazier Roy D.
Assistant Examiner—Rodney H. Bonck
Attorney—Elroy J. Wutschel

[57] ABSTRACT

A series of links designed to provide limited articulated movement while supporting flexible supply lines, with each link having a cam portion adjacent its pivot point which engages the cam surface of a pivot pin to limit pivotable movement therebetween and maximum pivotable movement with the adjacent link mounted on the same pivot pin.

7 Claims, 9 Drawing Figures

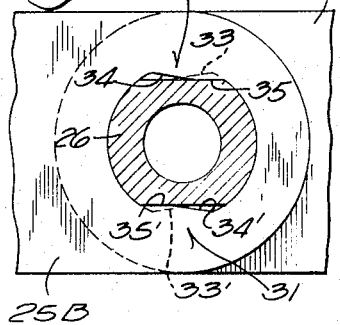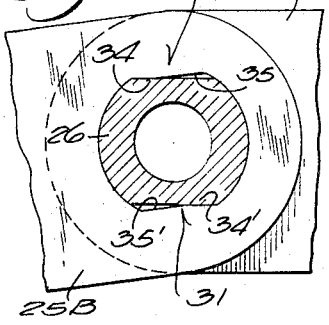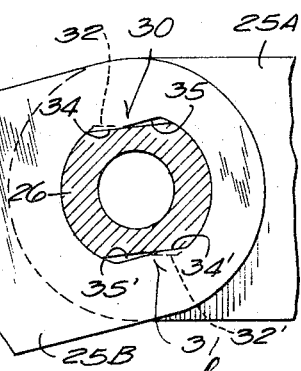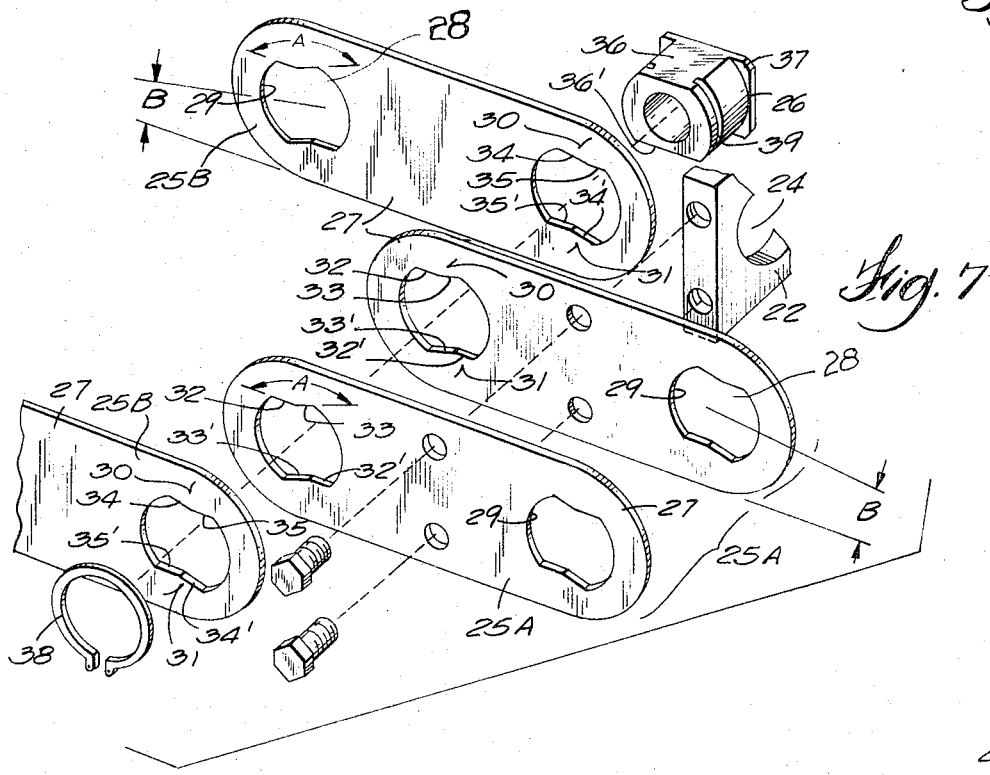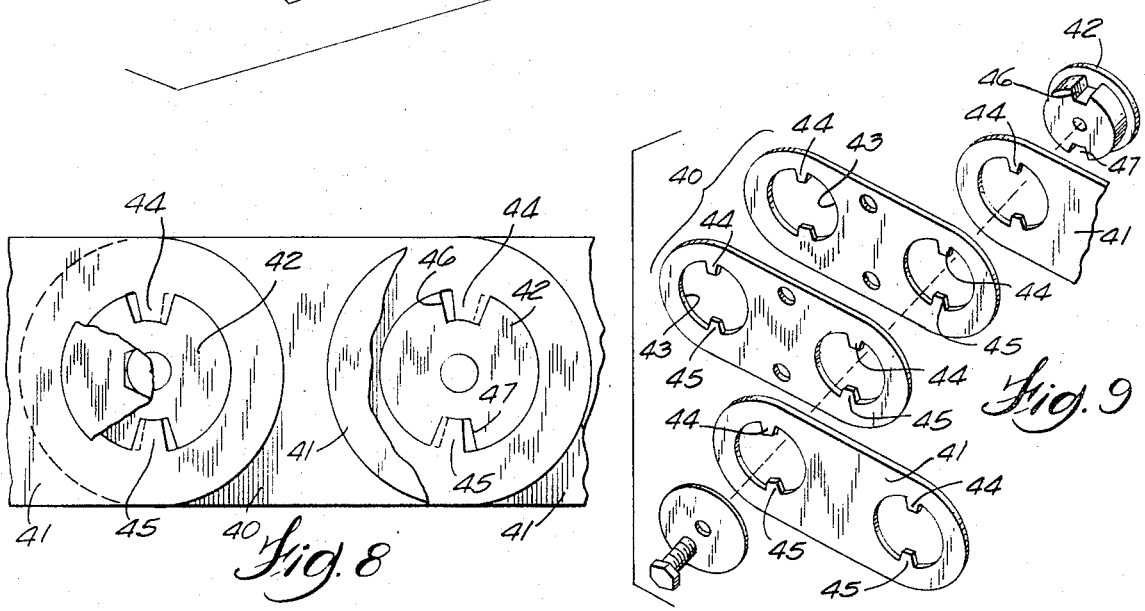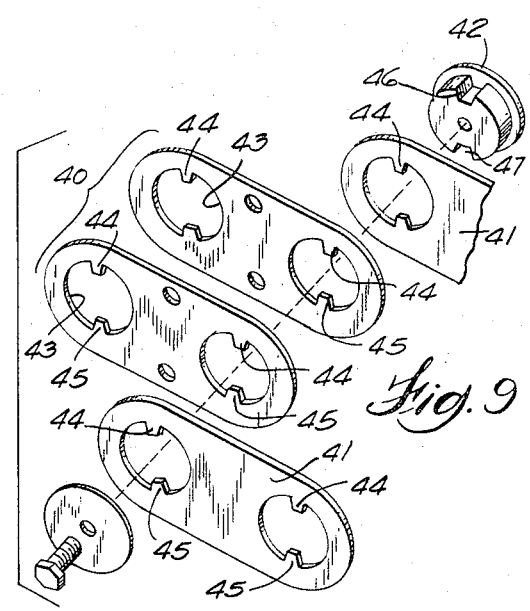

CARRIER LINK MECHANISM FOR FLEXIBLE SUPPLY LINES

BACKGROUND OF THE INVENTION

Machines such as machine tools, presses and the like have movable elements, requiring a source of electricity, hydraulic fluids, air, and lubricants which are supplied by means of flexible cables and hoses. In order to provide continuous protection for such cables, it is desirable that a carrier mechanism be operative to hold abrasive and chafing damage to the exterior of the cable or hose to a minimum and to restrict the bending thereof to a predetermined minimum radius whereby lateral or tensile loads exceeding tolerable limits which ultimately cause the collapse of a hose or serverance of a cable are prevented.

Various types of chains or carriers have been utilized for this purpose and have met with limited success. Some have functional limitations, or are physically hazardous to the operator; others are expensive to manufacture or maintain.

SUMMARY OF THE INVENTION

Thus, in order to improve upon the prior art as exemplifying the mechanisms in present day use, the general objective is to provide a new and improved carrier link assembly readily operative to continuously support flexible supply lines throughout their full range of movement. The assembly is trackless and self-supporting. The invention is based on a new configuration of link members, including a two-step cam portion at each pivot point. When assembled with an adjoining link member likewise having a two-step cam portion, each pair of interconnected links is movable relative to each other. Both cam portions operate on cam flats on the circumference of the pivot pin about which the two link members may pivot within the range of two limiting positions. The angular position of the cam portion relative to the longitudinal axis of the link member serves to fixedly limit the maximum range of movement of one link member to another. Thus, the selected angular position would need to be greater in link members designed to operate in a mechanism wherein cables or hoses were to be flexed in a relatively smaller radius, and conversely, smaller in those cases where cables or hoses were to be flexed in a relatively larger radius. An intermediate bar secured between a spaced pair of carrier link mechanisms serves to carry the cables or hoses per se.

DESCRIPTION OF DRAWINGS

The preferred form of the invention is shown in the drawings; it is to be understood, however, that the subject invention is not necessarily limited to the precise arrangements and instrumentalities therein shown.

In the drawings:

FIG. 4 is a side view of two pivotally joined carrier links cam positioned in one restricted position whereby the two links remain in longitudinal alignment;

FIG. 5 is a side view similar to FIG. 4 in which the two links are cam positioned on the pivot pin whereat the two links are disposed in an intermediate angular position;

FIG. 6 is a side view similar to FIGS. 4 and 5 in which the two carrier links are cam positioned in a second restricted position whereby the two links are at a maximum angular position relative to one another;

FIG. 7 is an exploded perspective view of the individual elements prior to assembly which comprise a pair of link members when assembled into a carrier link mechanism;

FIG. 8 is a modified version of a carrier link mechanism; and

FIG. 9 is an exploded perspective view of a carrier link mechanism of the type shown in FIG. 8.

DESCRIPTION OF THE PREFERRED EMBODIMENTS

Figure 1:
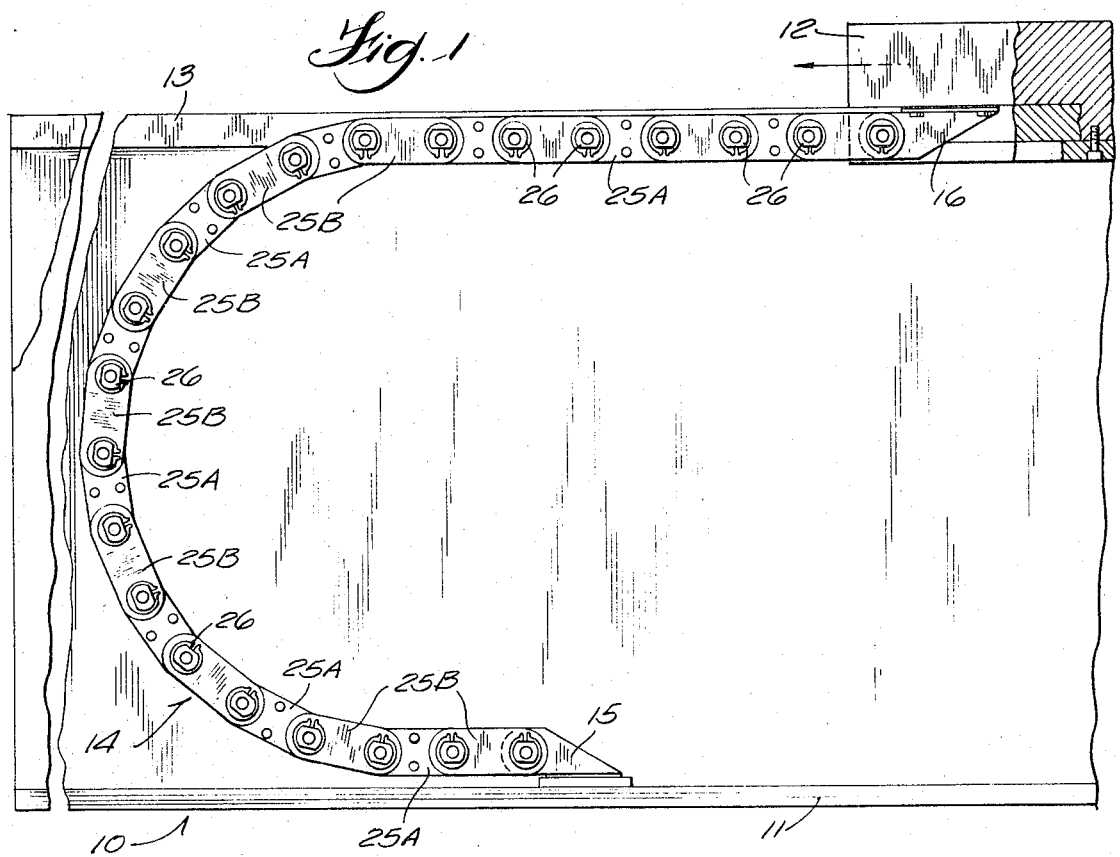
FIG. 1 is a side view of a machine showing a carrier link assembly having one end secured to the base of the machine and the other end secured to a movable member thereof.

Referring to the drawings in specific detail, there is shown in FIG. 1 a machine 10 comprised of a base 11 with a movable member 12 slidably operable on supporting ways 13. On certain machines, the movable members require a source of electricity, liquids, air, coolants and the like for use in connection with some functional or other operation. Delivery thereof is accomplished by means of flexible cables and hoses. This, in turn, creates a problem in that such cables and hoses are subjected to abrasive wear and damage from constant exposure and indiscriminate flexing, and the bending radius to which they are subjected must be limited to a predetermined minimum to prevent failure of the cables and hoses.

A carrier link assembly 14 is provided as a solution to this problem. One end of the assembly is secured to the machine base by an anchor lug 15 bolted thereto. The other end of the assembly is fixedly secured to an end of the movable member 12 by means of an end link 16. The carrier link assembly is designed to supportably carry any desired number of cables or hoses of like or varying sizes and configurations. The radius of the carrier link assembly 14 between the base 11 and the movable member 12 is established by the construction of the carrier link assembly as will be described.

Figure 2:
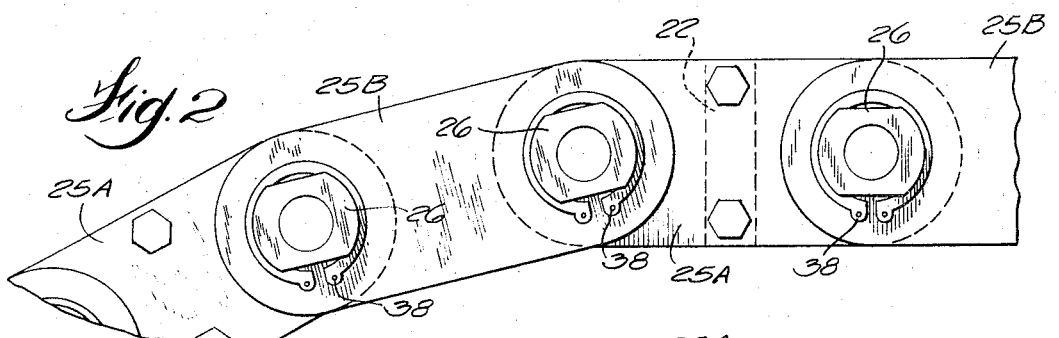
FIG. 2 is an enlarged side view of a segment of the chain link mechanism shown in FIG. 1.
Figure 3:
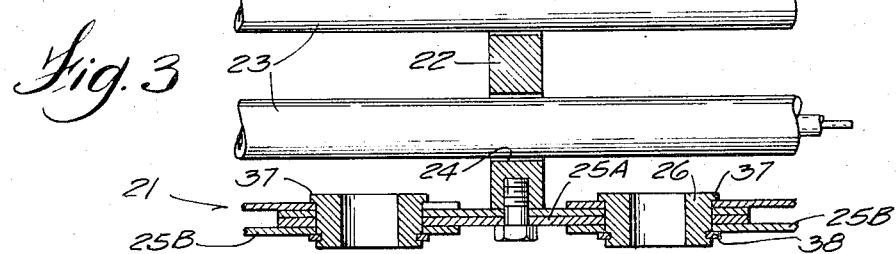
FIG. 3 is a top sectional view of a portion of a chain link assembly shown in FIG. 1.

The details of the carrier link assembly 14 are best viewed in FIGS. 2, 3 and 7, and include a pair of carrier link mechanisms 20 and 21 spaced apart to contain spacing bars 22. The bars 22 serve to carry cables or hoses 23 of varying sizes and configurations, in spaced apertures 24. The length of each bar 22 is dependent on the number of hoses and cables to be supported and carried by the assembly 14.

The two carrier link mechanisms 20 and 21 are each comprised of alternate identical pairs of link members 25A and 25B interconnected by pivot pins 26 to permit articulate movement between the link members. All link members are preferably of identical size and configuration.

As readily seen in FIGS. 3 and 7, the alternate link members 25A and 25B are each made up of two identical members 27 with those in 25A disposed in face to face relationship while those in 25B each overlay the exposed faces of the stampings in member 25A. The members 27 may be fabricated in a variety of manners, such as by casting, molding, machining or the like but for economical reasons it has been found preferable to form them by a stamping process. Since the members or stampings 27 which make up the two articulate members are identical, this enables rapid assembly in manufacture and service during use. It should be apparent, however, that the members 27 could be of sufficiently thick stock to enable the assembly of single stampings as link members without foregoing the teachings of this invention.

The members 27, as shown in FIG. 7, are each provided with two spaced openings 28 having an inside diameter 29 fitted to bear on the outer diameter of the pin 26. In addition, the configuration of the opening includes two cam sections 30 and 31 each having two angularly disposed flats which operate and controllably limit the range of articulated movement of each pair of links in the carrier link mechanisms.

As shown in FIG. 7, flats 32 and 33 compliment flats 32' and 33' respectively so that they cooperate with each other to partially establish the limits of angular movement of a link 25A relative to a connected link 25B. Thus, the flats 32 and 32' are parallel to each other, so that the flat 32 will engage one of a pair of parallely disposed faces 36 on the pin 26 while the flat 32' will simultaneously abut the opposite face 36' to limit the angular movement of the link 25A relative to the pin 26, in one direction.

Likewise, flats 34 and 35 compliment flats 34' and 35' respectively, so that they cooperate with each other to partially establish the limits of angular movement between a link 25A relative to a connected link 25B. The flats 34 and 34' are parallel to each other, so that the flat 34 will engage face 36 on the pin 26 while the flat 34' will simultaneously abut the opposite face 36' thereof to limit angular movement of the link 25B. Since the links 25A and 25B are both mounted on the same pin 26, the angular movement between the link 25A and the pin 26 and between link 25B and pin 26 establishes the total amount of angular movement between a given pair of links in a single direction.

The limit of angular movement of link 25A relative to link 25B in the opposite direction is controlled by the cam flats 33 and 33' on the link 25A and the cam flats 35 and 35' on the link 25B. Thus, parallely related flats 33 and 33' will simultaneously engage the faces 36 and 36' on the pin 26 to limit the angular movement between the link 25A and the pin 26. Also, the flats 34 and 34' on the link 25B upon engagement with pin faces 36 and 36' will determine the limit of angular movement between the link 25B and the pin 26. Thus, the movement of the link 25A relative to the pin 26 plus the movement of the link 25B relative to the pin 26 will determine the total angular movement between a connected pair of links 25A and 25B in the opposite direction.

It should be noted that the angular relationship between the flats 32 and 33 as well as between the flats 32' and 33' on link 25A, designated as Angle A (FIG. 7.) is identical to the angular relationship between the flats 34 and 35 as well as the flats 34' and 35' on link 25B. Thus, the greater the angle A between the cam flats, the lesser the degree of movement between a pair of links, while a smaller angular A relationship between the cam flats will permit a greater degree of movement between a pair of links.

While the configurations of the opening 28, including the cam flat portions, is identical in the links 25A and 25B, it should be noted that such openings are angularly offset from the longitudinal base line of the link by a predetermined angle designated as B; also, that the opening 28 at the opposite end of each link is offset by the same angular amount (B) but in the opposite direction. Thus, cam flats 32, 32' on link 25A will be in alignment with the two of the flats in the opening at the opposite end of the link. However, the other two cam flats 33, 33' on the same link will not be in alignment with the related flats in the opening at the opposite end of the link. The same condition prevails as to the openings in link 25B.

The illustrated embodiment in FIG. 1 shows an arrangement in which the link assembly is curvable in a predetermined fixed radius in one direction with the remaining portion being retained in a straight line because the flats 32, 32', 35 and 35' are disposed in a plane parallel to the longitudinal base line of the links. However, if such flats were disposed otherwise than in such related parallel plane to the base line, the link assembly could be designed to provide a predetermined controlled curvature in both directions depending upon the requirements for a particular application to a machine. In either case, the operational radius of the link assembly would be established by the angular relationship of the flat in the link openings 28. While each pair of links is controllably limited in movement, the sum total of a predetermined number of links will establish the radius in which a given link assembly will operate to carry hoses or cables while a member 12 of a machine 10 is moving on the ways thereof.

The operation of the flats of the links 25A and 25B in combination with the flats 36,36' on the pivot pin 26 is best seen in FIGS. 4, 5 and 6. In these views, the link 25A is behind the link 25B. In FIG. 4, the two links are retained in the straight line relationship. The link 25A has its flats 32 and 32'in engagement with the two faces 36—36' on the pivot pin 26 and the link 25B has its two flats 35 and 35' in engagement with the pin faces. Because of this arrangement the links cannot pivot upwardly from this position and, therefore, cannot sag but are retained in a straight line.

However, the two links 25A and 25B can pivot in the opposite direction and in FIGS. 5 and 6, the link 25B is shown pivoting downwardly in two stages. In FIG. 5 the pivot pin 26 is retained in the same position as in FIG. 4 but the link 25B has pivoted on the pin 26 and relative to the link 25A, and in doing so has moved flats 35—35' out of engagement with the faces 36—36' on the pivot pin 26. However, the flats 34—34' now are brought into engagement with the faces 36—36' on the pivot pin 26 to limit such movement of 25B in a counterclockwise direction, as viewed in FIG. 5.

However, since the pivot pin 26 is not fixed to the link 25A, it can also be pivoted relative to the link 25A, enabling the link 25B to pivot further relative to the link 25A to the position shown in FIG. 6. This pivotal movement of the pin 26 continues until its faces 36—36' engage the flats 33—33' of the link 25A. The total movement of the two connected links is dependent upon the movement of each with respect to the pins 26.

It should be understood that the pin 26 may be secured as an integral part of one of the links. In this case the amount of pivotal movement for a given angle of the flats on the links would be halved. Thus, if the pin 26 were fixed to the link 25A in the illustrated embodiment, the pivotal movement of link 25B from the position shown in FIG. 4 to the position shown in FIG. 5 would be available but it would then not be pivotable to the position shown in FIG. 6 relative to the link 25A.

In the illustrated embodiment there are shown two links 25A alternated between the links 25B which are also disposed in pairs. The links are laminated in pairs to provide the desired strength and yet permit the links to be readily stamped from blanks. The links could be fabricated of heavier material so that single links would follow each other in succession to form the assembly.

The full range of articulate movement is precisely limited in the manner aforedescribed. Such movement is forceably effected as the member 12 moves on ways on the base 11 of a machine 10. The camming occurs in reverse sequence when the movable member 12 moves in the opposite direction on the base; at this time, the link member 25B will move in a clockwise direction, as viewed in FIGS. 5 and 6 to again bring the links into a straight or longitudinal alignment. Naturally, the cables and/or hoses 23 supported in the carrier assembly 14 will be flexed accordingly.

For ready assembly, the one end of the pin 26 is provided with a shoulder 37 disposed to engage one side of a pair of assembled links (25A-B), while the other side is engaged and retained by a snap lock ring 38 disposed in a groove 39 adjacent the other end of the pin 26. Thus, the links 25A and 25B are constantly retained in diagonal alignment.

It should be apparent that a carrier link assembly constructed in the aforementioned manner affords a considerable improvement over the various types of supplyline support mechanisms known heretofore. The reduction in number and simplification in design of the parts used in the assembly has resulted in a chain link assembly which can be adapted to carry a wide range of types and sizes of supply cables and/or hoses. In addition, the link member and pivot pin design provides a means for carrying a greater load continuously during machine operation with reduced down time for repairs and preventative maintenance than was previously possible. With the aforedescribed link mechanism, the camming control is fully enclosed to provide protection against contaminents and to prevent injury to persons accidently engaging the link assembly.

A modified application of the same principles of this invention is shown in FIGS. 8 and 9. In this case, links 40 and 41 of identical configuration are assembled for articulate movement on a pin 42. The configured openings 43 in each end of the links are dimensioned to permit the links to be rotatably carried on the pin 42 and are further provided with inwardly projecting cams 44 and 45 oppositely disposed to fit in a pair of oppositely disposed cam slots 46 and 47, respectively, in the pin 42. The angular orientation of the openings 43 relative to the longitudinal base line of the link, likewise, predetermines the limits of relative movement between pairs of links, as well as the radial operational range of the carrier link assembly.

The present invention may be embodied in other forms of art departing from the spirit of potential attributes thereof described, and, accordingly, reference should be made to the appended claims, rather than to the foregoing specification as indicating the scope of the invention.

I claim:

1. In a support for flexible conduit; a plurality of support bars carrying the flexible conduit; a link assembly fixed to each side of said support bars, each of the links therein having an opening at each end; each of said openings having an axis extending transversely of said links; a plurality of pins with each pin having an axis and extending into one of the openings of at least two links with the axes of said pins remaining fixed relative to the axes of said openings to connect two successive links together for relative pivotal movement so that the plurality of links are connected together to form a chain on each side of said support bars with the two chains carrying the support bars and the flexible conduit carried thereby; limiting means on each of said pins; and restricting means on said links for engagement with the limiting means on said pins to limit the pivotal movement between two successive links to thereby establish the minimum radius that will be formed by the chain.

2. A support according to claim 1 wherein said limiting means on each of said pins comprises a cam face; and said restricting means in said link comprises a cam stop for engagement with the cam face on the cooperating pin to limit the pivotal movement of the link relative to the pin.

3. A support according to claim 2 wherein said cam stop on said link comprises a flat formed in the opening of said link complementary to the cam face on said pin for engagement therewith to limit the pivotal movement of the links relative to the pin.

4. A support according to claim 2 wherein said cam stop on said link limits the pivotal movement of said link relative to said pin in one direction, and said restricting means includes a second stop for engagement withe the cam face on the cooperating pin to limit the pivotal movement of the links relative to the pin in the opposite direction.

5. A support according to claim 4 wherein said stops are two flats formed in each of the openings of the links said flats being disposed at an angle to each other so that the first stop engages the cam face on the pin to limit the pivotal movement of the link relative to the pin in one direction and the second stop engages the cam face on the pin to limit the pivotal movement of the links relative to the pin in the opposite direction.

6. A support according to claim 1 wherein said restricting means comprises a projection extending from the periphery of each of the openings in said links towards the center of the opening; and said limiting means comprises a peripheral slot in each of said pins for receiving said projections, said slot being large enough to permit limited movement of said projections in said slot to thereby limit the pivotal movement of said links relative to said pin.

7. In a support for flexible conduit; a plurality of support bars carrying the flexible conduit; a chain assembly connected to each side of said support bars to carry the support bars and the flexible conduit carried thereby in a predetermined path of travel, each of said chains being formed by a plurality of links having an opening at each end; a pin connecting each of said links to the succeeding link by said opening for relative pivotal movement within prescribed limits; and limiting means operative to limit the pivotal movement between two successive links to thereby establish the minimum radius that will be formed by the chain, said limiting means comprise a projection extending inwardly from the periphery of each of said openings; and each of said pins being provided with peripheral slots for receiving said projections to permit limited movement of said projection in said slots to thereby limit the pivotal movement of said links relative to said pin.

* * * * *